United States Patent
Suzuki et al.

(10) Patent No.: US 8,130,435 B2
(45) Date of Patent: Mar. 6, 2012

(54) OPTICAL SCANNER AND COLOR IMAGE FORMING APPARATUS

(75) Inventors: Mitsuo Suzuki, Kanagawa (JP); Masaki Satoh, Miyagi (JP); Haruyuki Suzuki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 413 days.

(21) Appl. No.: 12/329,815

(22) Filed: Dec. 8, 2008

(65) Prior Publication Data

US 2009/0147336 A1 Jun. 11, 2009

(30) Foreign Application Priority Data

Dec. 11, 2007 (JP) ................... 2007-319116

(51) Int. Cl.
*G02B 26/08* (2006.01)
*G02B 26/10* (2006.01)
*G02B 26/12* (2006.01)

(52) U.S. Cl. ................... 359/213.1

(58) Field of Classification Search .... 359/196.1–199.4, 359/200, 200.6–200.8, 202.1, 203.1, 204.1–204.2, 359/212.1, 212.3–215.1, 221.1, 223.1–224.1, 359/225.1, 298, 300, 900; 250/216, 231.1, 250/231.11, 234–236; 358/474, 493–494; 347/233–235, 243, 259–260
See application file for complete search history.

(56) References Cited

U.S. PATENT DOCUMENTS

| | | | |
|---|---|---|---|
| 4,726,640 A | 2/1988 | Iwama et al. | |
| 5,069,515 A | 12/1991 | Itami et al. | |
| 5,726,699 A | 3/1998 | Itami et al. | |
| 5,739,602 A | 4/1998 | Suzuki et al. | |
| 6,580,186 B1 | 6/2003 | Suzuki et al. | |
| 6,778,203 B2 | 8/2004 | Itami et al. | |
| 6,822,775 B2 | 11/2004 | Suzuki et al. | |
| 7,045,773 B2 | 5/2006 | Suzuki et al. | |
| 7,050,082 B2 | 5/2006 | Suzuki et al. | |
| 7,167,288 B2* | 1/2007 | Miyatake et al. | 359/204.4 |
| 7,403,316 B2 | 7/2008 | Amada | |
| 7,436,564 B2* | 10/2008 | Gomi et al. | 359/213.1 |
| 2003/0021497 A1* | 1/2003 | Kandori et al. | 382/323 |
| 2004/0119002 A1* | 6/2004 | Bush et al. | 250/234 |
| 2007/0070483 A1* | 3/2007 | Ishihara et al. | 359/213 |
| 2007/0236557 A1 | 10/2007 | Imai et al. | |
| 2008/0024590 A1 | 1/2008 | Nakajima | |
| 2008/0068678 A1 | 3/2008 | Suzuki et al. | |
| 2008/0088889 A1 | 4/2008 | Suzuki | |
| 2008/0204846 A1 | 8/2008 | Itabashi et al. | |

FOREIGN PATENT DOCUMENTS

| | | |
|---|---|---|
| JP | 2004-279947 | 10/2004 |
| JP | 2005-215571 | 8/2005 |
| JP | 2005-292627 | 10/2005 |
| JP | 2007-058205 | 3/2007 |
| JP | 2007-086335 | 4/2007 |

* cited by examiner

*Primary Examiner* — Stephone Allen
*Assistant Examiner* — Kimberly N Kakalec
(74) *Attorney, Agent, or Firm* — Dickstein Shapiro LLP

(57) ABSTRACT

An optical scanner is disclosed that has an optical source unit that emits a laser beam; a vibration mirror by which the laser beam from the optical source unit is deflected to scan; a driving circuit that vibrates the vibration mirror based on a driving signal generated from a reference clock; a light-receiving element that receives the laser beam within the scanning area of the laser beam; and a controlling unit that corrects the driving signal so as to make a phase deviation between the reference phase clock and the output signal of the light-receiving element constant.

7 Claims, 9 Drawing Sheets

FIG.5B OUTPUT OF PD1
FIG.5C OUTPUT OF PD2
FIG.5D REFERENCE PHASE CLOCK

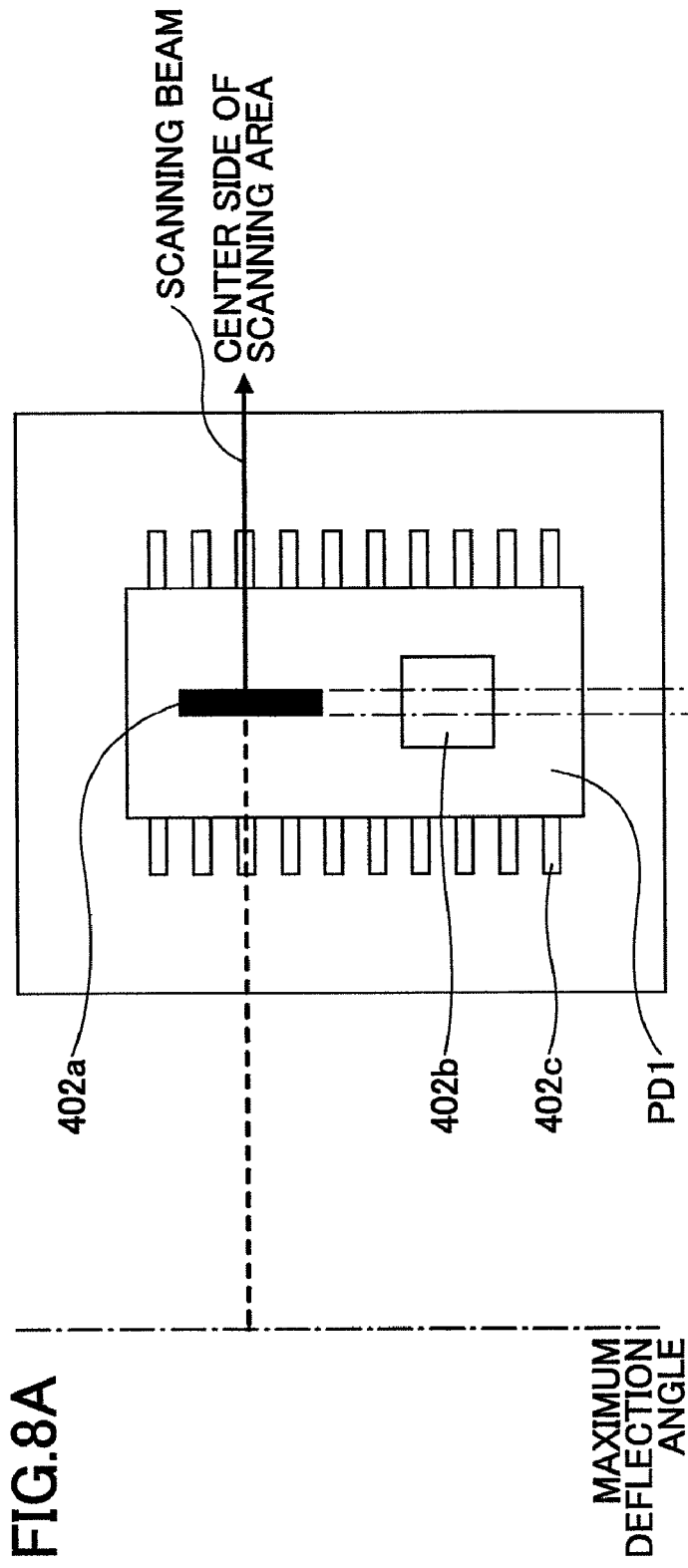
FIG.8A
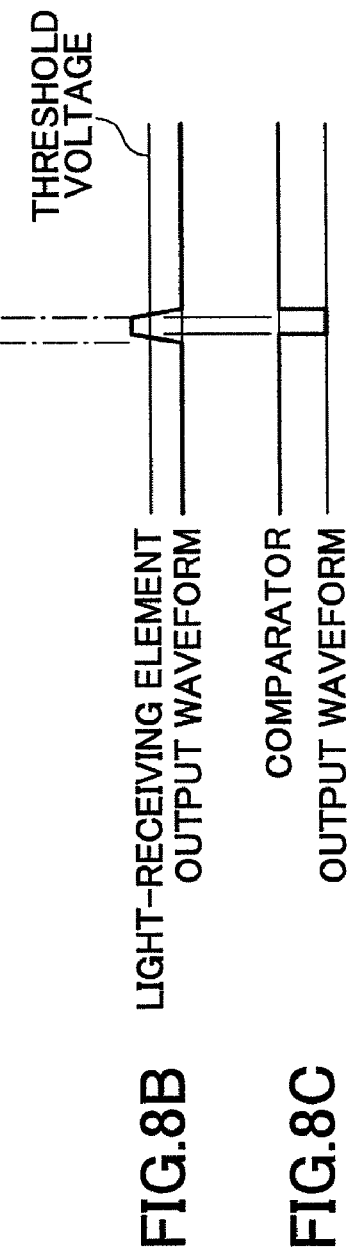
FIG.8B  LIGHT-RECEIVING ELEMENT OUTPUT WAVEFORM
FIG.8C  COMPARATOR OUTPUT WAVEFORM

OPTICAL SCANNER AND COLOR IMAGE FORMING APPARATUS

BACKGROUND OF THE INVENTION

1. Field of the Invention

The present invention relates to an optical scanner having a vibration mirror used for a laser raster writing optical system and a color image forming apparatus.

2. Description of the Related Art

Up until now, in order to allow a color image forming machine to perform high-speed printing and realize high image quality, it is required that a polygon scanner rotate at a high speed of 25000 rpm or more and with high accuracy. On the other hand, the high image quality can be obtained with the reduction of the diameter of a laser beam. Therefore, the radius of the inscribed circle and the length in the main scanning direction of a polygon mirror used for the polygon scanner become relatively large, which results in an increase in the load of the polygon scanner.

When the load of the polygon scanner increases, its consumption power increases and heat generated by the polygon scanner adversely affects optical elements such as a scanning lens. Specifically, the temperature of the scanning lens closest to the polygon scanner increases. The heat generated by the polygon scanner is transmitted or radiated to an optical housing, which increases the temperature of the scanning lens. However, the increase in the temperature of the scanning lens is not uniform. That is, the temperature distribution of the scanning lens is concentrated particularly in its main scanning direction as a longitudinal direction based on a distance from the heat generation source (polygon scanner) or a difference between the thermal expansion coefficients of materials and the influences of airflow.

If the scanning lens has the temperature distribution that is mostly concentrated in the main scanning direction, its shape accuracy and refractive index are changed, which in turn particularly fluctuates the spot position of a laser beam and degrades the quality of an image. This problem is pronounced in plastic having a large thermal expansion coefficient.

The color image forming machine performs scanning with laser beams corresponding to colors (yellow, magenta, cyan, and black). Therefore, besides the above problem, a temperature deviation between optical scanners corresponding to the respective colors is generated. The temperature deviation causes the shift of a relative positional relationship between the spots of beams corresponding to the respective colors, which results in the color shift of an image.

In addition, with the increase in the temperature of the polygon mirror having a large load, small movements of components (particularly the polygon mirror having a high mass ratio) constituting a rotating body are induced. As a result, the rotating body gets out of balance and generates vibrations. If the thermal expansion coefficients of the components (the polygon mirror, a flange to which a rotor magnet is fixed, and a shaft) constituting the rotating body are different, or if the tolerances of the components, a method for fixing the components, etc., are not strictly managed and inspected even where the thermal expansion coefficients of the components are the same, the rotating body generates small movements (gets out of balance) when rotating at high temperature and high speed, and thus increases vibrations. The vibrations are transmitted and amplified to the optical element (such as a return mirror) of the optical scanner. As a result, banding is generated to cause the degradation of an image and noises.

In view of this problem, Patent Document 1 has proposed an optical scanner in which the polygon mirror is replaced by a vibration mirror (resonant mirror). With this optical scanner, a beam is detected by a synchronization detection sensor and a terminal detection sensor that is arranged near a part having a scanning angle $\theta 0$, and a time difference between a synchronization detection signal and a terminal detection signal is calculated by an amplitude calculation unit. Thus, the deflection angle (amplitude $\theta 0$) of the resonant mirror is detected. Here, assuming that the scanning angle of the optical beam detected by the sensors is $\theta d$, a scanning time from the center of an image is t, and the driving frequency of the resonant mirror is fd, the formula $\theta d/\theta 0 = \sin 2\pi \cdot fd \cdot t$ (wherein $t=T/2$) is provided. The deflection angle of the resonant mirror is corrected in such a manner that the gain of a voltage pulse applied is varied until this time difference T reaches a predetermined reference value T0. Accordingly, even if there is a fluctuation in the number of resonant vibrations inherent in the vibration mirror, joints are unnoticeable. As a result, it becomes possible to perform high-definition image formation without causing color shift and discoloration.

However, the above configuration requires plural (m pieces) resonant mirrors for each color and that requires m×4 pieces of the resonant mirrors so as to be compatible with colors (tandem arrangement). Because the joints per se still exist even if the deflection angles of the resonant mirrors are corrected, the degradation of an image cannot be eliminated in principle. Moreover, the phases of the resonant mirrors between the colors are controlled with the arrangement of plural of the resonant mirrors for each color in the tandem arrangement. However, the configuration cannot correspond to a driving signal that drives the resonant mirrors according to a temperature variation and a pressure variation in time and environment that cause variations in the phase of the resonant mirror. As a result, the degradation of an image (color shift and color shading) is caused.

Patent Document 1: JP-A-2004-279947

SUMMARY OF THE INVENTION

The present invention has been made in light of the above problems and may provide an optical scanner that reduces an increase in the temperature of a scanning lens to be used and temperature deviations and vibrations of optical scanners of a color image forming machine and prevents the temporal positional deviations of beam spots and realizes high image quality and quietness by the reduction of color shift of the color image forming machine with the provision of the controlling unit of a vibration mirror. In addition, the present invention may provide a color image forming apparatus using the optical scanner.

According to an embodiment of the present invention, the following configurations are provided so as to solve the above problems.

According to an aspect of the present invention, there is provided an optical scanner including an optical source unit (optical source 10) that emits a laser beam; a vibration mirror (vibration mirror 11) by which the laser beam from the optical source unit is deflected to scan; a driving unit that vibrates the vibration mirror based on an input driving signal; and a controlling unit that corrects the driving signal so as to cancel a phase variation of an actual amplitude waveform of the vibration mirror relative to an ideal amplitude waveform of the vibration mirror based on the driving signal (FIGS. 1 and 6C).

It is preferable that the optical scanner further include a light-receiving element (light-receiving element PD1) that receives the laser beam within a scanning area of the laser beam, the driving signal be generated from a reference clock (reference phase clock), and the controlling unit correct the driving signal so as to make a phase deviation (time interval C) between the reference clock and an output signal (output signal at the posterior end of a time interval A) of the light-receiving element constant, thereby controlling the phase of an amplitude waveform of the vibration mirror (FIGS. 5A through 5D and 7).

With these configurations, the controlling unit prevents the phase variation of the vibration mirror, thereby making it possible to prevent the variations of beam spots in all the colors in a sub-scanning direction and maintain the same with high accuracy. Therefore, the optical scanner that causes less color shift and color shading can be provided.

It is preferable that the controlling unit correct the driving signal based on the output signals of the light-receiving elements (light-receiving elements PD1 and PD2), thereby controlling the amplitude and/or the offset of the amplitude waveform of the vibration mirror (FIG. 7).

It is preferable that the light-receiving element include a first light-receiving element (light-receiving element PD1) and a second light-receiving element (light-receiving element PD2), and the controlling unit correct the driving signal so as to make a computation using time intervals (time intervals A and B) of the output signals of the first and second light-receiving elements being equal to a target value, thereby controlling the amplitude or the offset of the amplitude waveform of the vibration mirror (FIG. 7).

With these configurations, the controlling unit controls the amplitude and/or the offset of the amplitude waveform of the vibration mirror, thereby making it possible to prevent the variations of beam spots in all the colors in a main scanning direction and maintain the same with high accuracy. Therefore, the optical scanner that causes less jitter (fluctuation in a vertical line) and a main scanning magnification error can be provided.

It is preferable that the controlling unit control the phase of the amplitude waveform of the vibration mirror with the amplitude and the offset of the amplitude waveform of the vibration mirror being controlled.

With this configuration, the phase of the amplitude waveform of the vibration mirror is controlled with the amplitude and the offset of the vibration mirror being controlled, thereby making it possible to realize reduced controlling time and high accuracy. Therefore, the optical scanner that responds to prevent the variations of the beam spots in a short period of time and realize high accuracy can be provided.

It is preferable that the optical source unit be turned off or dimmed at a timing at which the laser beam is deflected to scan between the vicinity of the light-receiving element and a position at which the amplitude waveform of the vibration mirror has the maximum amplitude (FIG. 8).

With this configuration, the optical source unit is turned off or dimmed at the timing at which the laser beam is deflected to scan between the vicinity of the light-receiving element and the position at which the amplitude waveform of the vibration mirror has the maximum amplitude. Therefore, it is possible to prevent the occurrence of ghost light (erroneous detection of the light-receiving element) due to optical components and prevent malfunctions and instability in controlling operations. In addition, it is possible to extend the service life of the optical sources made of semiconductor lasers and reduce an increase in the temperature of the optical source units.

It is preferable that the optical source unit include plural optical source devices (optical source units 10Y, 10M, 10C, and 10K), and the laser beams emitted from the plural optical source devices be deflected to scan by the single vibration mirror (vibration mirror 11) (FIG. 1).

With this configuration, the laser beams emitted from the optical scanners are deflected to scan by the single vibration mirror. Therefore, the optical scanner that realizes the downsize of the apparatus as a whole and the reduction of consumption power (energy saving) can be provided.

According to another aspect of the present invention, there is provided a color image forming apparatus that forms a latent image on a latent image carrier by optical scanning and makes the latent image visible to obtain a desired recording image. The apparatus includes the optical scanner described above is used.

With this configuration, the color image forming apparatus having the features described above can be provided.

Other objects, features and advantages of the present invention will become more apparent from the following detailed description when read in conjunction with the accompanying drawings.

BRIEF DESCRIPTION OF THE DRAWINGS

FIGS. 5A through 5D are graphs showing a relationship between the amplitude waveform of the vibration mirror, the output signal of a light-receiving element, and a reference phase clock according to the embodiment of the present invention;

FIG. 8 shows a relationship between the light-receiving element and a laser beam for scanning.

DETAILED DESCRIPTION OF THE PREFERRED EMBODIMENTS

Next, a description is made of a configuration of an optical scanner according to an embodiment of the present invention.

Figure 1:
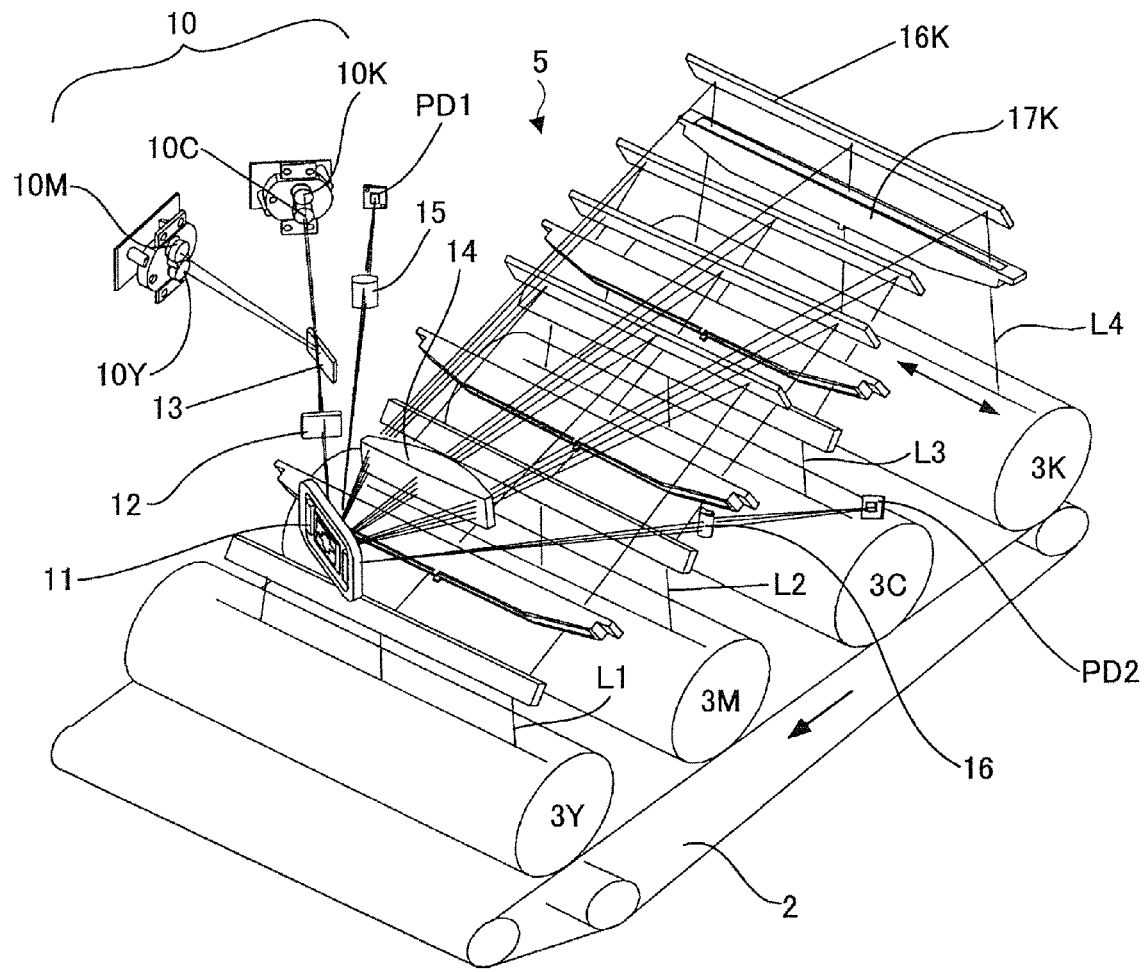
FIG. 1 is a perspective view showing a configuration of an optical scanner according to an embodiment of the present invention.

FIG. 1 is a perspective view showing a configuration example of the optical scanner according to the embodiment of the present invention.

Figure 9:
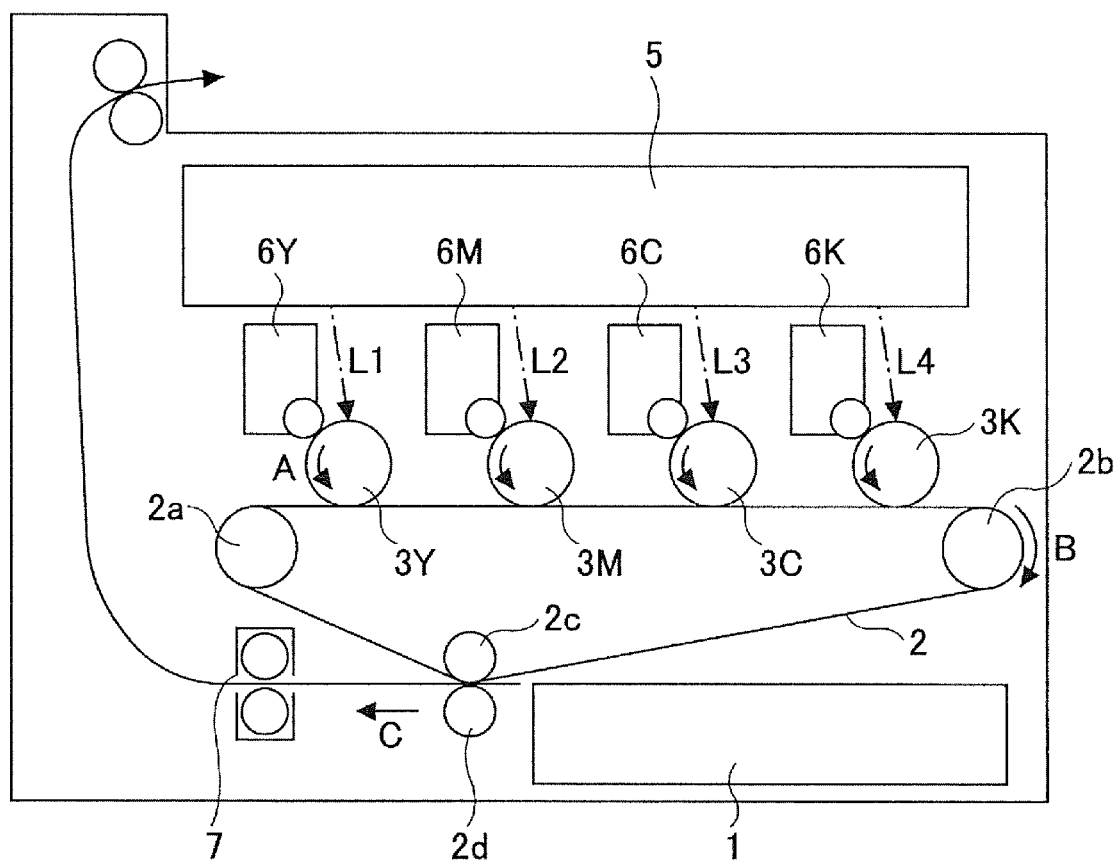
FIG. 9 is a cross-sectional schematic view showing a configuration of a color image forming apparatus according to the embodiment of the present invention.

In this configuration example, the optical scanner 5 is arranged above an image forming section in an image forming apparatus shown in FIG. 9. In the image forming section, four photosensitive drums 3Y, 3M, 3C, and 3K (hereinafter additional characters Y, M, C, and K are added to corresponding reference numerals to differentiate them according to the colors of Y (yellow), M (magenta), C (cyan), and K (Black)) are provided side by side. Furthermore, the optical scanner 5 has four optical sources corresponding to the colors, an optical deflection unit (vibration mirror 11) by which laser beams from the optical sources are deflected to scan, and a scanning image-forming optical system that directs the laser beams onto surfaces to be scanned of the photosensitive drums 3Y, 3M, 3C, and 3K. These constituent members are accommodated in an optical housing (not shown).

An optical source 10 as an optical source device has four "optical source units" (10Y, 10M, 10C, and 10K) each composed of a semiconductor laser and a coupling lens so as to correspond to the colors. The four semiconductor lasers of the optical sources emit a luminous flux for writing component images in the respective colors of yellow, magenta, cyan, and black. The luminous flux emitted from the semiconductor lasers is converted into a luminous flux form (a parallel luminous flux or a weak divergent or convergent luminous flux) suited to a following optical system by the coupling lens. Then, the converted luminous flux is converged in a sub-scanning direction by a cylindrical lens 12 via a return mirror 13 and formed as a long linear image in a main scanning direction near the deflective reflection surface of the vibration mirror 11 as a deflection and scanning unit.

On the side of the vibration mirror 11 on which the luminous flux is incident, a laser transmissive member (not shown) is arranged. The luminous fluxes from the optical sources 10 are incident on the vibration mirror 11 via the laser transmissive member. Then, the four colors of luminous fluxes deflected in the same direction by the swing of the vibration mirror 11 pass through a first lens 14 that constitutes the scanning lens group of the scanning image-forming optical system.

The luminous flux for writing a black component image is reflected by a mirror 16K (for example, at the top end of the lens), passes through a second lens 17K that constitutes the scanning lens group, converges as an optical spot on the drum-shaped photoconductive photosensitive drum 3K serving as the surface to be scanned, and optically scans the front surface of the photosensitive drum 3K in the direction as indicated by the arrow. The constituent members 14 and 17K of the scanning lens group are made of a plastic material that is easily formed into an aspheric shape and less costly. Specifically, it is preferable that the plastic material is a polycarbonate that has a low water absorption rate, high transmittance, and an excellent moldability or a synthetic resin material that is mainly composed of polycarbonate.

In the same manner as the above, each of the luminous fluxes for writing the component images in the colors of yellow, magenta, and cyan is also reflected by a mirror, passes through a lens, forms an image as an optical spot on the photosensitive drum, and optically scans in the same direction as indicated by the arrow. With this optical scanning, electrostatic latent images of the component images in the corresponding colors are formed on the respective photosensitive drums. Note that the optical elements and the like equivalent to the colors other than black are not added with reference numerals. However, constituent members that have the additional character "K" representing black after their reference numeral are also arranged in the same optical positions for the colors of yellow, magenta, and cyan.

The electrostatic latent images are made visible with the toner of the corresponding colors by development devices and transferred onto an intermediate transfer belt 2. In a transferring process, toner images in the respective colors are superposed one on another to constitute a color image. This color image is transferred and fixed onto a sheet-shaped recording medium. The intermediate transfer belt 2 onto which the color image is transferred is cleaned up by a cleaning device.

As described above, using the vibration mirror 11 as the optical deflection unit, the optical scanner 5 in FIG. 1 deflects the luminous fluxes emitted from the plural optical source units corresponding to the two or more color component images of the color image so as to scan in the same direction. Furthermore, the optical scanner has the first lens 14 of the scanning image-forming optical system through which the deflected luminous fluxes in the respective colors commonly pass; and four scanning image-forming units that correspond to the respective color components and cause the luminous fluxes to converge independently toward the surfaces to be scanned corresponding to the component images in the respective colors with the lenses (e.g., the lens 17K for the scanning image-forming optical system for writing the black component image) provided in the scanning image-forming units so as to perform optical scanning.

Here, the laser beams in the respective colors incident on the reflection surface of the vibration mirror 11 has a desired angle relative to the sub-scanning direction (so-called an oblique incident optical system). Specifically, the maximum angle of the laser beam is set to be 5° or smaller. If the incident angle is 5° or larger, scanning lines greatly curve on the surfaces to be scanned and the diameters of the laser beams increase, which results in the degradation of an image. On the other hand, if the laser beams in the respective colors are incident horizontally rather than obliquely on the reflection surface (oblique incident angle of 0°), the reflection surface requires a larger width in the sub-scanning direction, which results in an increase in the load of the vibration mirror 11 and makes it impossible to increase a vibrational frequency.

Note that the scanning lenses are fixed to the contact surface of the optical housing by bonding, and particularly the scanning lenses are preferably bonded only at the central areas of their bonding surfaces in the main scanning direction of the scanning lenses. This is because the scanning lenses expand and deform toward both ends from the central areas due to the thermal expansion of the lenses. Therefore, the scanning lenses do not freely expand due to temperatures and deform irregularly in the main scanning direction, which in turn can prevent a magnification error in the main scanning direction from locally increasing. Because it is possible to decrease the number of components and achieve the fixing at an inexpensive manufacturing cost due to the simplification of a fixing step, the fixing by bonding is the most appropriate.

Next, the vibration mirror 11 is described in detail.

Figure 2A:
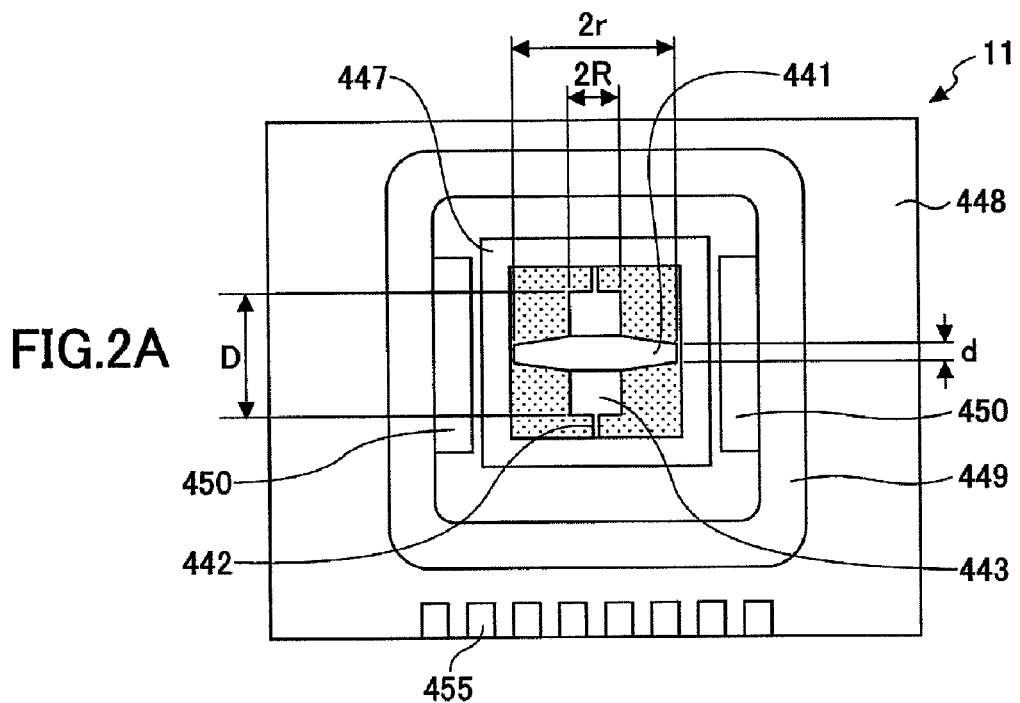
FIGS. 2A through 2C are specific views showing a configuration of a vibration mirror.
Figure 3:
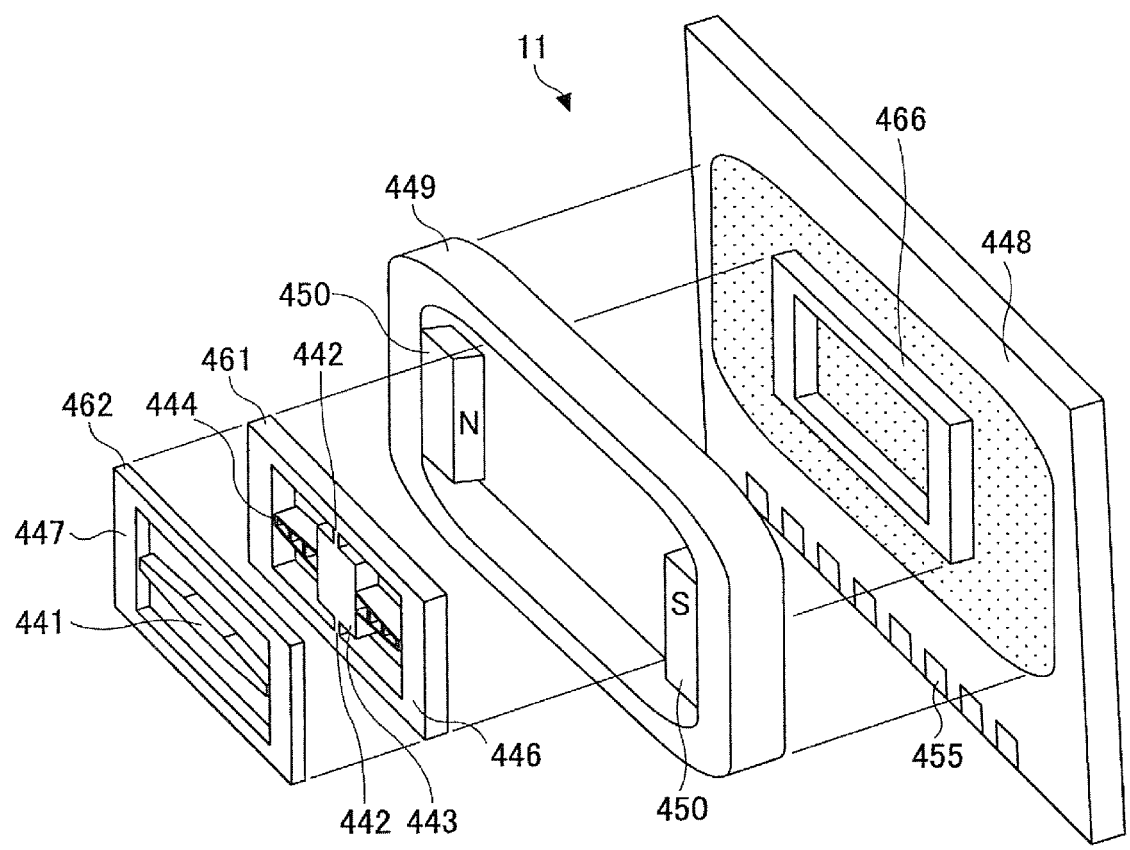
FIG. 3 is an exploded perspective view of the vibration mirror.

FIG. 2A is a specific view of the vibration mirror 11 as an embodiment, and FIG. 3 is an exploded perspective view of the vibration mirror 11. The vibration mirror 11 is composed of a movable mirror part 441 that has a mirror surface on its front surface and constitutes a vibrator, a torsion beam 442 that supports the movable mirror part 441 and constitutes a rotating shaft, and a frame 446 that constitutes a supporting part. The vibration mirror 11 is formed by cutting out an Si substrate through etching.

In this embodiment, the vibration mirror 11 is manufactured by the use of a wafer in which two substrates called SOI substrates each having a thickness of 60 μm and 140 μm, respectively, are bonded together through an oxidized film in advance. First, parts other than the torsion beam 442, a vibration plate 443 in which a plane coil is formed, a reinforcing beam 444 that constitutes the framework of the movable mirror part 441, and a frame 447 of the wafer are penetrated up to the oxidized film through a drying process using plasma etching from the front surface of the substrate 461 (second substrate) having a thickness of 140 μm. Then, parts other than the movable mirror part 441 and the frame 447 of the wafer are penetrated up to the oxidized film through anisotropy etching using KOH from the front surface of the substrate (first substrate) having a thickness of 60 μm. Finally, the oxidized film around the movable mirror part 441 is removed and separated so as to form the structure of the vibration mirror 11 (FIGS. 2A and 3). Here, the widths of the torsion beam 442 and the reinforcing beam 444 are in the range of 40 μm through 60 μm.

Figure 2B:
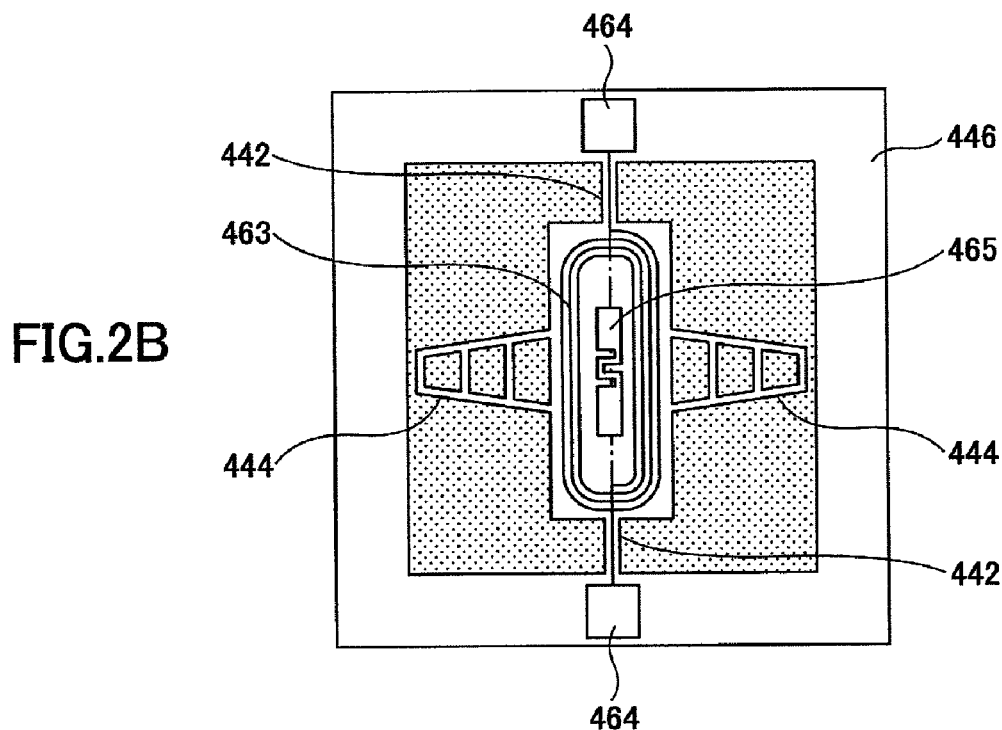
Figure 2C:
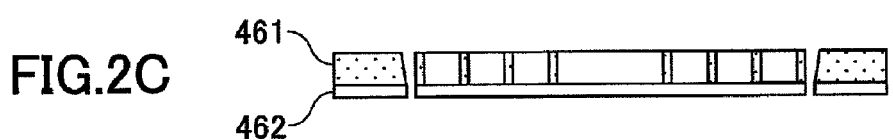

In order to have a large deflection angle, it is desired that the inertia moment I of the vibrator be small. On the other hand, because the mirror surface of the vibration mirror 11 deforms due to an inertia force, the movable mirror part 441 is structured to be hollow in the embodiment. Moreover, on the front surface of the substrate 464 having a thickness of 60 μm, an aluminum thin film is deposited so as to form the reflection surface. On the front surface of the substrate 461 having a thickness of 140 μm, terminals 464 that are made of a copper thin film and wired via a coil pattern 463 and the torsion beam 442 and a trimming patch 465 are formed (see FIGS. 2A and 2B). Of course, it is possible to provide a thin-film-shaped permanent magnet on the vibration plate 443 and form a planar coil on the frame 447.

On a mounting substrate 448, a frame-shaped base 466 to which the vibration mirror 11 is attached and a yoke 449 formed to surround the vibration mirror 11 are arranged. The yoke 449 is united with a pair of permanent magnets 450 whose negative and positive poles oppose to the ends of the movable mirror part 441 and which generate a magnetic field in a direction orthogonal to the rotating shaft (see FIG. 3).

The vibration mirror 11 is attached to the base 466 with the mirror surface facing to a top side. When a current is fed to the terminal 464, the Lorentz force is generated in respective sides parallel to the rotating shaft of the coil pattern 463 and the torsion beam 442 is twisted to generate rotary torque T for rotating the movable mirror part 441. When the current is turned off, the movable mirror part 441 returns to a horizontal position due to the restoring force of the torsion beam 442.

Accordingly, when the direction of the current fed to the coil pattern 463 is alternately switched, the movable mirror part 441 can be vibrated in a reciprocating manner. If a cycle for switching the current comes close to the characteristic frequency of a primary vibration mode using the torsion beam 442 as the rotating shaft, i.e., to resonant frequency vibration f0 in the structure constituting the vibration mirror 11, an amplitude is excited to thereby provide a large deflection angle.

Because the mass and inertia of the movable mirror part 441 of the vibration mirror 11 are extremely smaller than those of conventional polygon mirrors, the driving part of the movable mirror part 441 is downsized. Therefore, the consumption power of the movable mirror part 441 can be reduced along with the high efficiency of a magnetic circuit (1/10 or smaller than that of the polygon mirror). As a result, the amount of heat generated by the vibration mirror 11 becomes small, which makes it possible to substantially prevent an increase in the temperatures of the optical elements of a writing optical system and the housing. Therefore, particularly a resin scanning lens does not have a local temperature distribution, which in turn can prevent color shift without changing the scanning positions of laser beams during the formation of a color image.

In addition, due to the small mass and inertia of the movable mirror part 441, the amount of vibrations (vibrations due to the unbalanced mass of the movable mirror part 441) of the movable mirror part 441 transmitted to an outside is small (1/1000 or smaller than that of the polygon mirror) during its swinging operation. Therefore, substantially no vibration is transmitted to the optical elements of the writing optical system, which in turn can eliminate the banding (variations in roughness and fineness in the sub-scanning direction) caused by the vibrations of the return mirror 13 during the formation of an image.

In order to take advantage of the vibration mirror 11, the following control is required. Here, a preferred example is described.

Figure 4:
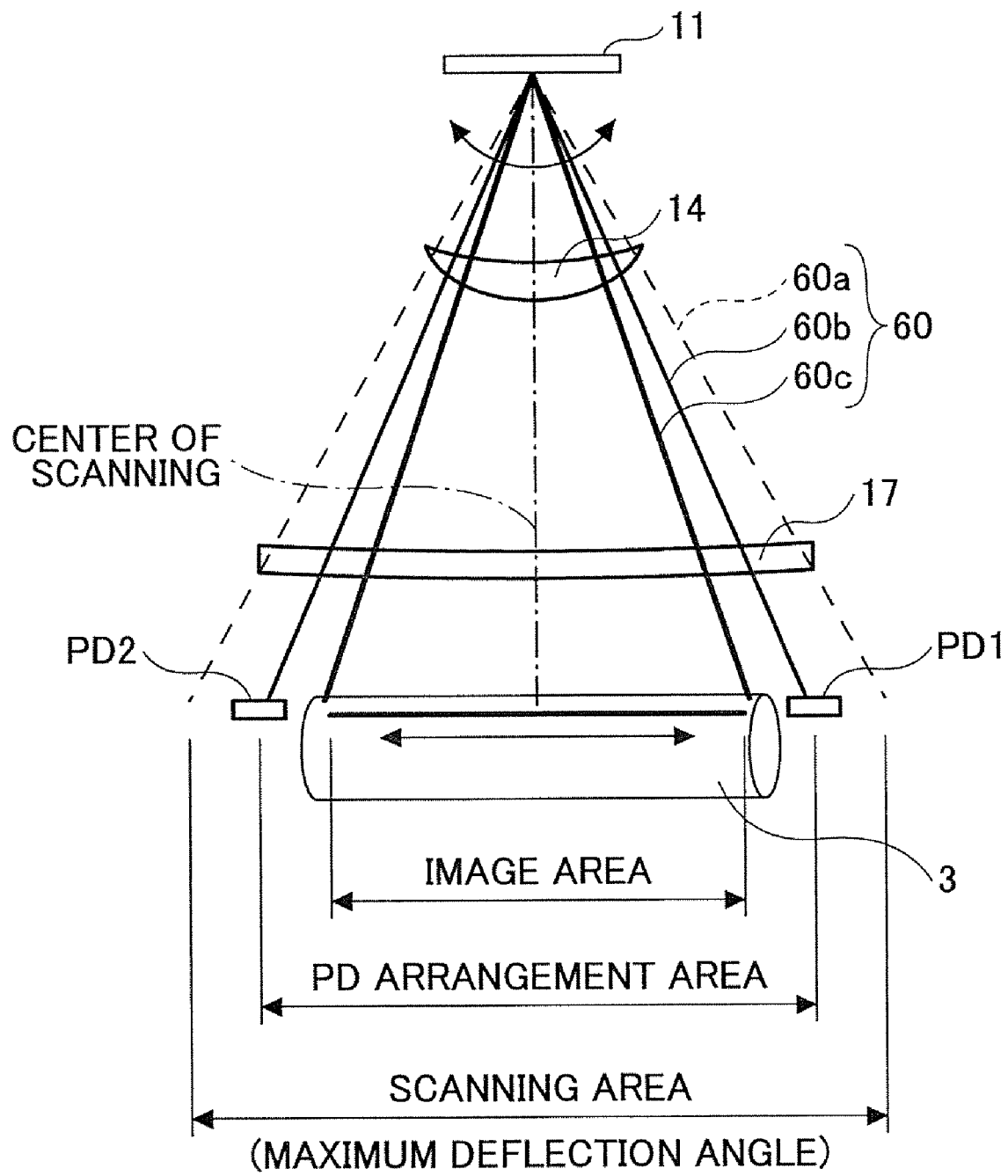
FIG. 4 schematically shows a substantial part from the vibration mirror to a photosensitive drum in the optical scanner according to the embodiment of the present invention.

FIG. 4 schematically shows a substantial part corresponding to one of the photosensitive drums in the color-image forming optical scanner 5 shown in FIG. 1. A laser beam 60 deflected to scan by the vibration mirror 11 is divided depending on scanning positions. That is, the one at the scanning position at which the vibration mirror 11 has the maximum deflection angle is a laser beam 60a. Furthermore, the one at the scanning position at which the laser beam 60 is incident on light-receiving elements PD1 and PD2 arranged within the maximum deflection angle and caused to scan at a timing at which an output signal is transmitted is a laser beam 60b. Furthermore, the one at the scanning position at which the laser beam 60 is caused to scan the ends of an image area on the photosensitive drum 3 is a laser beam 60c.

Figure 5A:
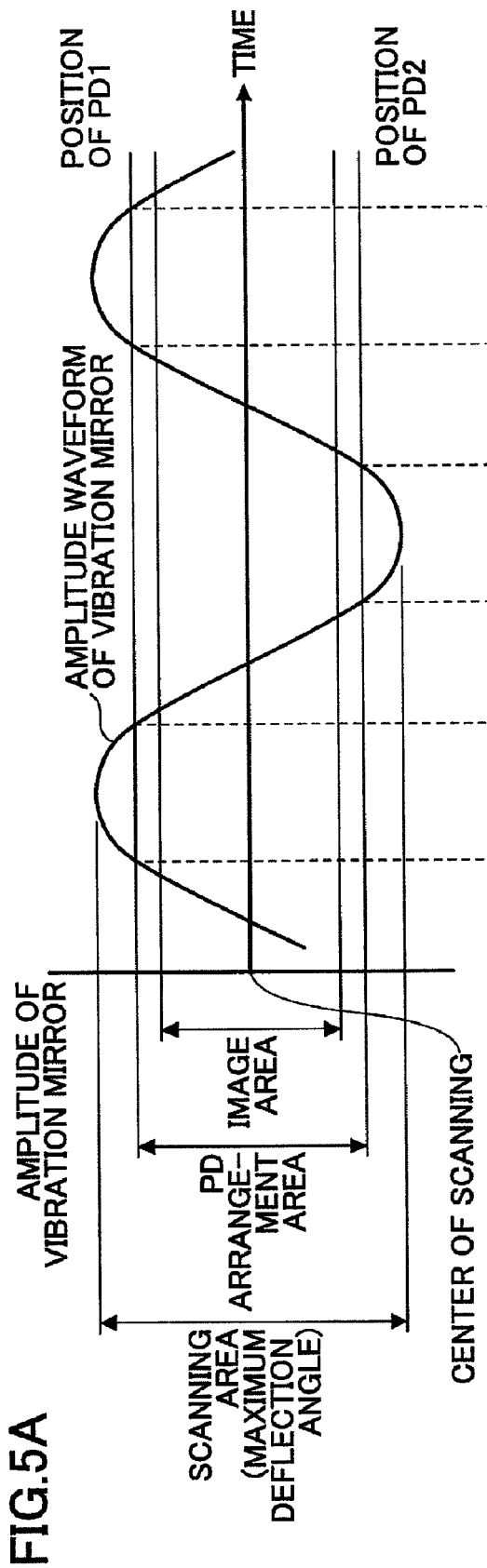
Figure 5A:
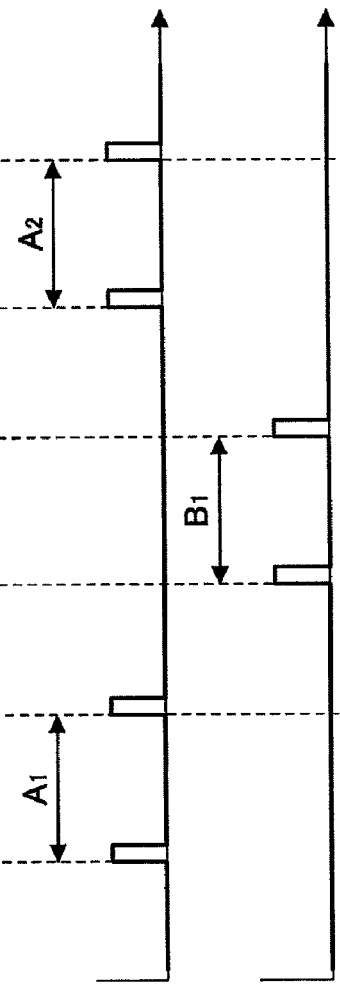
Figure 5A:
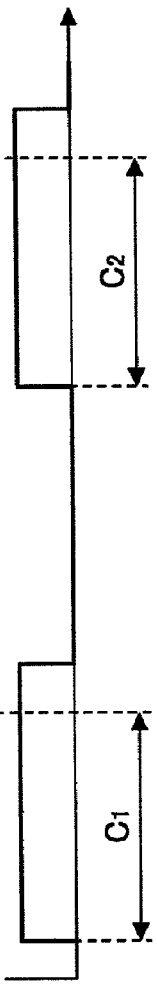

FIG. 5A shows the amplitude of the vibration mirror 11 (magnitude of variations in the deflection angle of the vibration mirror 11) relative to time. Because the vibration mirror 11 generates a large amplitude using a resonance phenomenon, the locus of the amplitude of the vibration mirror 11 is drawn like a sine wave relative to time and the scanning speed of the laser beam 60 deflected to scan is not constant but different depending on the scanning positions (if there is no scanning lens). The scanning lenses 14 and 17 have an f·arcsin characteristic so as to make the scanning speed constant.

Figure 6A:
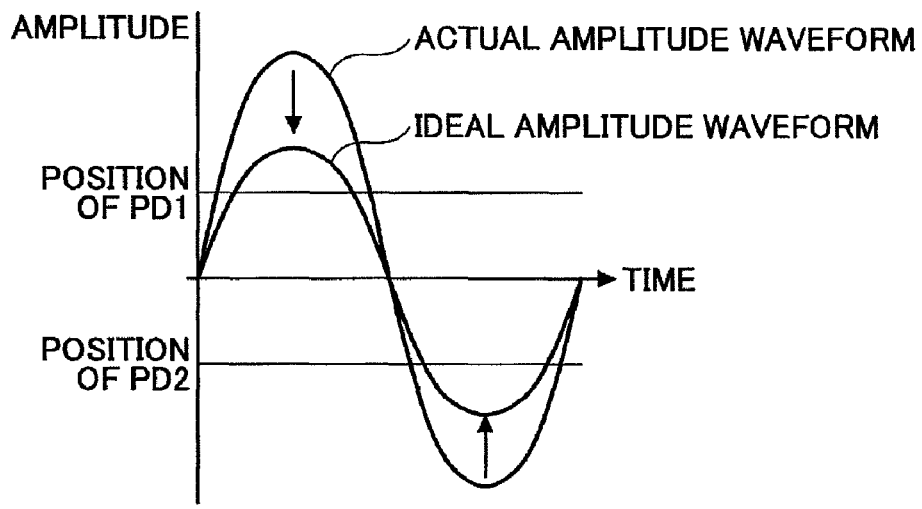
FIGS. 6A through 6C are graphs showing the states of the amplitudes of amplitude waveforms of the vibration mirror, offsets, and phase variations.
Figure 6B:
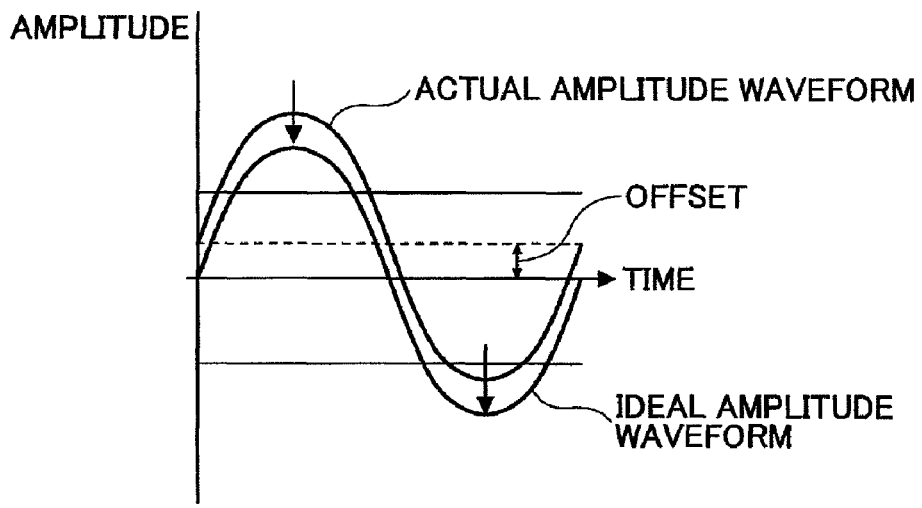
Figure 6C:
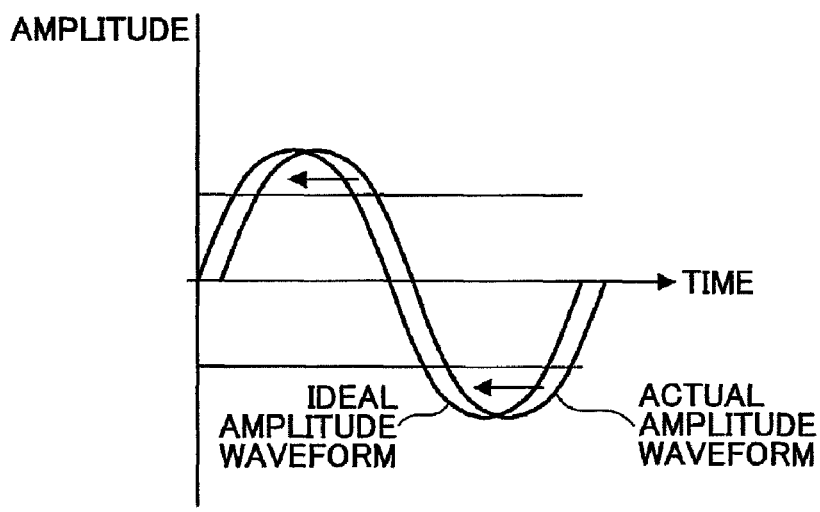

Here, even if the scanning lens having such a characteristic is used, variations in the swing of the vibration mirror 11 shown in FIGS. 6A through 6C are caused. Thus, various controlling operations are made so as to reduce the variations. In other words, when the frequency (driving signal) of the vibration mirror 11 is constant, the amplitude waveform of the vibration mirror 11 must be an ideal amplitude waveform (sine waveform). However, amplitude waveforms actually generated are deviated from the ideal amplitude waveforms shown in FIGS. 6A through 6C, which results in the changes in the scanning positions of the laser beam 60 and the degradation of an image.

FIG. 6A shows an amplitude variation. If the amplitude is greater than a target value (same applies to a case in which the amplitude is smaller than the target value), the amplitude waveform is corrected in the directions as indicated by the arrows so as to obtain the amplitude of an ideal amplitude waveform. For the purpose of this, control is made so that the computation values of time intervals A ($A_1, A_2, \ldots, A_n$ in FIG. 5B) determined by two output signals of the light-receiving element PD1 and time intervals B ($B_1, \ldots, B_n$ in FIG. 5C) determined by two output signals of the light-receiving element PD2 shown in FIGS. 5B and 5C become constant. Specifically, the average values of $(A_1+B_1)/2$, $(A_2+B_2)/2$, ..., $(A_n+B_n)/2$ are calculated, and the calculated average values for plural times are averaged (average values for n times are averaged) so as to obtain a target control value uniquely defined by a resonance frequency.

FIG. 6B shows a positional relationship between the center of an amplitude waveform of the vibration mirror 11 and the center of a scanning area, wherein there is an offset between an actual amplitude waveform and the center of the scanning area (ideal amplitude waveform). In order to eliminate the offset, control is made so that the computation values of the time intervals A ($A_1, A_2, \ldots, A_n$ in FIG. 5B) of the output of the light-receiving element PD1 and the time intervals B ($B_1, \ldots, B_n$ in FIG. 5C) of the output of the light-receiving element PD2 shown in FIGS. 5B and 5C become constant. Specifically, differences between $A_1-B_1, A_2-B_2, \ldots, A_n-B_n$ are calculated, and the calculated differences for several times are averaged (calculated differences for n times are averaged) so as to obtain a target value of zero.

FIG. 6C shows a phase variation of the amplitude waveform of the vibration mirror 11. Even if there is the phase variation (phase deviation in a temporal axis direction) as shown in the actual amplitude waveform in FIG. 6C, the phase variation is corrected in the direction as indicated by the arrows. That is, in order to obtain the ideal amplitude waveform, control is made so that a time interval C (phase deviation) between a reference phase clock by which a signal for driving the vibration mirror 11 as shown in FIGS. 5B and 5D is generated and the output of the light-receiving element PD1 become constant. Specifically, the time intervals $C_1, C_2, \ldots$, etc., are averaged for plural times so as to obtain a target value of zero. At this time, as the output of the light-receiving element PD1 for counting the time intervals, one (at the posterior end of A) of the two outputs at a timing right before an image forming area is preferred. This is because the output of the light-receiving element PD1 right before the writing of an image (at the posterior end of A) provides higher accuracy for the alignment of the phases (if the output at the anterior end of the time interval A is used, phase accuracy during the formation of an image is degraded due to the phase variation within the time A).

Here, because the amplitude or the offset shown in FIGS. 6A and 6B is a phenomenon different from that of an ideal scanning speed, a deviation in the scanning position is caused in the main scanning direction. For example, image degradation such as jitter (fluctuation in a vertical line) in the main scanning direction or a main scanning magnification error is caused. Note that this is a common issue not only for a color image but also for a monochrome image. On the other hand, the phase variation shown in FIG. 6C is a problem peculiar to color image formation. As shown in FIG. 1, the single vibration mirror 11 causes the laser beams emitted from the optical sources in the respective colors to scan the corresponding photosensitive drums depending on an image signal. However, if there is the phase variation, the deflected scanning positions of the laser beams are changed. Therefore, positions in the sub-scanning direction on an image (intermediate transfer belt) are changed, which results in color shift and color shading.

Figure 7:
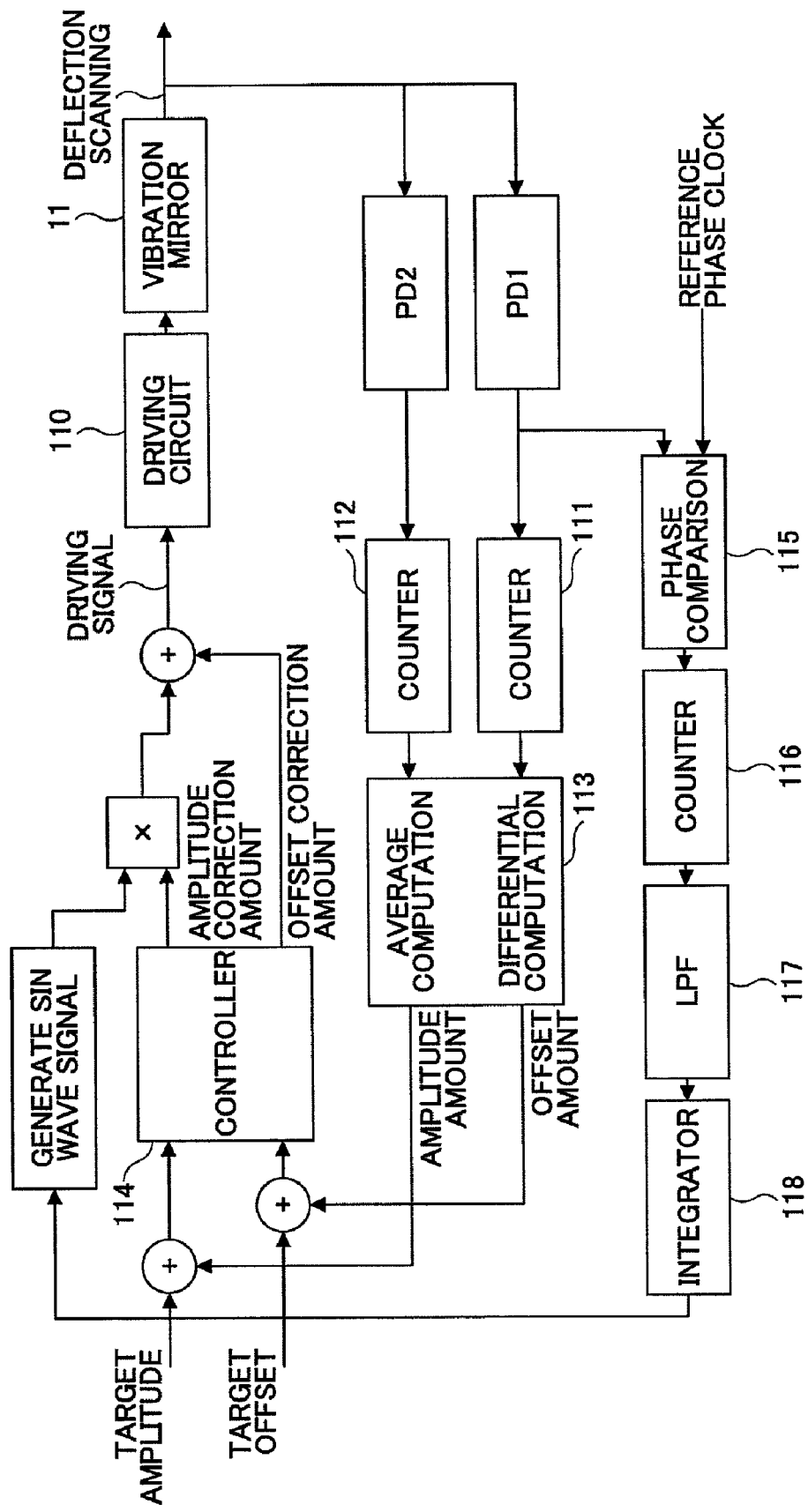
FIG. 7 is a block diagram of a controlling unit for the driving of the vibration mirror.

FIG. 7 is a block diagram showing a control system (controlling unit) that realizes the amplitude, offset, and phase control in the optical scanner 5 according to the embodiment of the present invention.

The time intervals A and B of the signals output from the laser beams that are deflected to scan the light-receiving elements PD1 and PD2 are calculated by corresponding counters 111 and 112. Then, a computing unit 113 compares the average of (A+B)/2 with a target amplitude, compares the average of the differences (A−B) with a target offset (zero in this embodiment), and outputs the results to the controller 114. The reason why the average is taken each time (reason for performing averaging processing) is to prevent the control from being made based on incorrect information when unexpected electrical noise is mixed in. Note that averaging processing is performed for 2 through 10 times. This is because if the averaging processing is performed for 10 times or more, a correction timing is delayed, which results in an increase in a control deviation.

The controller 114 computes the correction amounts of the amplitude and the offset in accordance with the comparison results and causes the driving signal of the corrected sine wave to be amplified in a driving circuit (amplifier) 110 of the vibration mirror 11 so as to drive and control the vibration mirror 11. The loop of the control system is a loop for controlling the amplitude and the offset.

Then, in a state in which the amplitude and the offset are normally controlled to fall in desired ranges relative to target values, a phase control loop is executed in such a manner as to cancel the phase variation of an actual amplitude waveform of the vibration mirror 11 relative to an ideal amplitude waveform of the deflection angle of the vibration mirror 11 based on the driving signal of the vibration mirror 11 generated from a reference phase clock (reference clock). In other words, the phase control is high-accuracy control compared with the amplitude and offset control. Therefore, if all of the control is executed at the same time, they are interfered with each other. In addition, the variation amount of the driving signal increases. As a result, it takes times for the amplitude and the offset to fall in control target value ranges. Therefore, the amplitude and the offset are preferentially controlled as coarse adjustment, and the phase is controlled as minute adjustment, which makes it possible to reduce time until the amplitude and the offset fall in the control target value ranges.

As the phase control, a phase deviation between the output signal of the light-receiving element PD1 and the reference phase clock (time interval C in FIG. 5D) is detected by a phase comparator 115 and then calculated by the counter 116. Based on the calculated results, a LPF (Low Pass Filter) 117 and an integrator 118 generate a DC corresponding to the phase deviation. In accordance with the amount of the voltage, control (so-called Phased Locked Loop) for changing a phase is made so that the phase deviation (time interval C) between the reference phase clock (reference clock) and the output signal of the light-receiving element PD1 becomes constant. Next, as for the generation of a sine wave signal for a phase change, a sine wave signal is generated that forms an optimum phase in accordance with the increments of phase variation amounts (resolution performance) prepared in advance. Accordingly, the driving signal of the vibration mirror 11 is corrected, and the phase change of the actual amplitude waveform of the vibration mirror 11 relative to the ideal amplitude waveform of the deflection angle of the vibration mirror 11 is cancelled.

Note that the generation and resolution performance of the sine wave signal corresponding to the phase control requires high accuracy over the allowable range of the control. However, the high accuracy requires a larger memory, which results in high manufacturing costs. Accordingly, the control range of the generation and resolution performance of the sine wave signal is set to be 50 μm or smaller so as to visually recognize the size of color shift in the sub-scanning direction.

FIG. 8 shows a relationship between the light-receiving element PD1 as an example and the laser beam for scanning. Note that the light-receiving element PD1 is arranged at a position optically equivalent (in a beam diameter and a scanning speed) to the laser beam that scans the surfaces of the photosensitive drums as shown in FIG. 1. It is preferably arranged on the scanning extension line of the surfaces of the photosensitive drums, but the laser beam may scan the light-receiving element PD1 via the return mirror 13 for convenience of layout.

The light-receiving element PD1 is composed of an amplification circuit that amplifies the output signal of a light-receiving part made of a PIN photodiode and of a comparator circuit that shapes the waveform of the output signal, and is packaged as an IC by a laser-beam transmissive member made of a resin. In FIG. 8, reference numerals 402*a*, 402*b*, and 402*c* denote the light-receiving part, a circuit part, and an IC lead, respectively (see FIG. 8A). When a scanning beam passes through the light-receiving part 402a, a comparator output signal shown in FIG. 8C is generated.

In an area indicated by dotted lines on the left of the light-receiving part 402a in FIG. 8A, the optical source units are turned off (or the amount of the light of the optical source units is reduced so as to prevent flare light in the light-receiving elements from forming latent images on the photosensitive drums). If the optical source produces luminescence in an area between the maximum deflection angle of the vibration mirror 11 and the vicinity of the light-receiving element PD1, ghost light is generated due to the scattered reflection of optical components arranged in the optical scanner 5, which in turn causes noise in signals to the light-receiving elements PD1 and PD2. As a result, the time intervals A, B, and C are disordered to cause malfunctions and instability in controlling operations. In order to prevent this problem, the optical source units are turned off at the above timing (or the amount of the light of the optical source units is reduced so as to prevent the ghost light in the light-receiving elements from forming latent images on the surfaces of the photosensitive drums). With the turning-off or reduction of the light of the optical source units, it is possible to extend the service life of the optical sources made of semiconductor lasers and reduce an increase in the temperature of the optical source units. Here, the "vicinity of the light-receiving elements PD1" refers to a scanning position at the timing at which the time intervals A, B, and C can be normally calculated without having an influence on the output of the comparator circuit.

Note that if the amount of light is reduced when the reflectance and the transmittance of the optical elements are lowered (degraded with time), a rising time for a threshold voltage that determines the output of the comparator circuit becomes long (because the inclination becomes small), which results in an erroneous detection. Therefore, in order to solve this problem, the optical sources are controlled so that the amount of light becomes constant when the light-receiving element PD1 is scanned.

Meanwhile, in the above description, the sine wave is used as the example of the driving signal. However, the generation of the sine wave requires a number of bits for DA conversion and a high-capacity memory. Therefore, it is also possible to use a rectangular wave that is generated from a crystal oscillator at low cost. Furthermore, as for the swing of the vibration mirror 11 in the embodiment, the scanning is performed in a reciprocating manner. However, the photosensitive drums are scanned (in a so-called zigzag form) so as to make the scanning position in the sub-scanning direction come close to the ends of the maximum deflection angle. Therefore, if there are problems such as blurring of characters and density irregularity on both ends of an image in the reciprocating scanning, one way scanning is performed to solve this problem.

Next, a color image forming apparatus according to the embodiment of the present invention is described.

FIG. 9 is a block diagram showing the color image forming apparatus using the optical scanner 5 according to the embodiment of the present invention. The color image forming apparatus is of a tandem type in which the plural photosensitive drums 3Y, 3M, 3C, and 3K are arranged side by side in a line. In the color image forming apparatus, the optical scanner 5, the development devices 6 (6Y, 6M, 6C, and 6K), the photosensitive drums 3 (3Y, 3M, 3C, and 3K), the intermediate transfer belt 2, a fixing device 7, and a sheet feeding cassette 1 are arranged in this order from the top of the apparatus.

On the intermediate transfer belt 2, the photosensitive drums 3Y, 3M, 3C, and 3K corresponding to the respective colors are arranged at even intervals in the order of their arrangement. The diameters of the photosensitive drums 3Y, 3M, 3C, and 3K are the same, and members are sequentially arranged around the photosensitive drums 3Y, 3M, 3C, and 3K in such a manner as to follow an electrophotographic process. Taking the photosensitive drum 3Y as an example, an electrifying charger (not shown), a laser beam L1 that is emitted from the optical scanner 5 and based on an image signal, the development device 6Y, a transfer charger (not shown), a cleaning device (not shown), etc., are arranged sequentially. The same applies to the other photosensitive drums 3M, 3C, and 3K. In other words, according to the embodiment of the present invention, the photosensitive drums 3Y, 3M, 3C, and 3K are used as surfaces to be scanned for the respective colors, and the laser beams L1, L2, L3, and L4 are emitted from the optical scanner 5 to the corresponding photosensitive drums.

The photosensitive drum 3Y uniformly charged by the electrifying charger is rotated in the direction as indicated by arrow A to scan with the laser beam L1 in the sub-scanning direction. As a result, an electrostatic latent image is formed on the photosensitive drum 3Y. Furthermore, on the downstream side of the irradiating position of the laser beam L1 with the optical scanner 5 in the rotating direction of the photosensitive body 3, the development device 6Y that supplies toner to the photosensitive drum 3Y is arranged so as to supply the yellow toner. The toner supplied from the development device 6Y adheres to the part of the electrostatic latent image to form a toner image. In the same manner, a toner image in a single color of M, Y, and K is formed on the corresponding photosensitive bodies 3M, 3C, and 3K. On the further downstream side of the arrangement position of the development device 6Y of the photosensitive drum 3Y in the rotating direction, the intermediate transfer belt 2 is arranged.

The intermediate transfer belt 2 is wrapped around plural rollers 2a, 2b, and 2c and moved and conveyed in the direction as indicated by arrow B when a motor (not shown) is driven. The single color images developed by the photosensitive drums 3Y, 3M, 3C, and 3K are sequentially superposed one on another and transferred onto the intermediate transfer belt 2. As a result, a color image is formed on the intermediate transfer belt 2. Then, a transfer sheet is conveyed from a sheet feeding tray 1 in the direction as indicated by arrow C, and the color image is transferred onto the transfer sheet. The transfer sheet on which the color image is formed is subjected to fixing processing by the fixing device 7 and then ejected as a color image sheet.

The present invention is not limited to the specifically disclosed embodiments, and variations and modifications may be made without departing from the scope of the present invention.

The present application is based on Japanese Priority Application No. 2007-319116 filed on Dec. 11, 2007, the entire contents of which are hereby incorporated herein by reference.

What is claimed is:

1. An optical scanner comprising:
an optical source unit that emits a laser beam;
a vibration mirror by which the laser beam from the optical source unit is deflected to scan;
a driving unit that vibrates the vibration mirror based on an input driving signal generated from a reference clock;
a controlling unit that corrects the driving signal so as to cancel a phase variation of an actual amplitude waveform of the vibration mirror relative to an ideal amplitude waveform of the vibration mirror based on the driving signal; and a light-receiving element that receives the laser beam within a scanning area of the laser beam, wherein the controlling unit corrects the driving signal so as to make a phase deviation between the reference clock and an output signal of the light-receiving element constant, thereby controlling a phase of an amplitude waveform of the vibration mirror, and wherein the driving signal is corrected such that the phase deviation of one of two outputs of the output signal of the light-receiving element for a given time interval is selected, for use in correction of the driving signal, at a time right before forming an image.

2. The optical scanner according to claim 1, wherein the controlling unit corrects the driving signal based on the output signal of the light-receiving element, thereby controlling an amplitude and/or an offset of the amplitude waveform of the vibration mirror.

3. The optical scanner according to claim 2, wherein the light-receiving element comprises a first light-receiving element and a second light-receiving element, and the controlling unit corrects the driving signal so as to make a computation using time intervals of output signals of the first and second light-receiving elements being equal to a target value, thereby controlling the amplitude or the offset of the amplitude waveform of the vibration mirror.

4. The optical scanner according to claim 2, wherein the controlling unit controls the phase of the amplitude waveform of the vibration mirror with the amplitude and the offset of the amplitude waveform of the vibration mirror being controlled.

5. The optical scanner according to claim 1, wherein the optical source unit is turned off or dimmed at a timing at which the laser beam is deflected to scan between a vicinity of the light-receiving element and a position at which the amplitude waveform of the vibration mirror has a maximum amplitude.

6. The optical scanner according to claim 1, wherein the optical source unit comprises plural optical source devices, and the laser beams emitted from the plural optical source devices are deflected to scan by the single vibration mirror.

7. A color image forming apparatus that forms a latent image on a latent image carrier by optical scanning and makes the latent image visible to obtain a desired recording image, the apparatus comprising:

the optical scanner according to claim 1.

* * * * *